Nov. 10, 1953     D. W. KELBEL     2,658,412
TRANSMISSION
Filed April 13, 1948     4 Sheets-Sheet 2

Fig. 2

Inventor:
Donald W. Kelbel
By Edward C. Gietzlaugh
Atty.

Patented Nov. 10, 1953

2,658,412

UNITED STATES PATENT OFFICE 2,658,412

TRANSMISSION

Donald W. Kelbel, Muncie, Ind., assignor to Borg-Warner Corporation, Chicago, Ill., a corporation of Illinois Application April 13, 1948, Serial No. 20,728

9 Claims. (Cl. 74—645)

My invention relates to transmissions, particularly for automotive vehicles, and more specifically to such transmissions which contain hydrodynamic coupling devices.

It is an object of the invention to provide improved gearing for use with a hydrodynamic coupling which provides three forward drives of different ratios and a reverse in series with the hydrodynamic coupling. It is contemplated that the lowest of the three forward speeds may be used only as an emergency speed and that there may be an automatic upshift between the two higher speeds, and to this end it is an object of the invention to provide such gearing to include a planetary gear set and a countershaft type gear set connected in tandem with each other and with the hydrodynamic coupling. The countershaft gear set may be conditioned for either of two forward speed ratios or for reverse and the countershaft gear may be power shifted, that is, shifted by engagement of a friction coupling, into either of two speed ratios.

It is another object of the invention to provide a brake for the rotor or driven element of the hydrodynamic device which when engaged facilitates the engagement of the positive clutch with which the countershaft gear set is preferably provided for conditioning the gear set for either its low or high speed ratio forward drive, and it is also an object of the invention to provide a controlling mechanism for use with such a brake which insures that the brake is released when the transmission is actually in any of its speed ratios. A connection with the operator's shift lever for shifting the positive clutch in the countershaft transmission is preferably provided, so that the brake for the rotor is engaged only preliminary to a shift of the positive clutch in the countershaft transmission.

It is a further object of the invention to provide improved controls for such a transmission which are such as to prevent an upshift in the planetary gear set when the countershaft gear set is conditioned for reverse. Improved controlling mechanism utilizing a vacuum motor connected with the manifold of the vehicle engine for completing an upshift in the planetary gear set is also contemplated.

My invention consists of the novel constructions, arrangements and devices to be hereinafter described and claimed for carrying out the above stated objects and such other objects as will appear from the following description of a preferred embodiment of the invention, with reference being made to the accompanying drawings, in which:

Like characters of reference designate like parts in the several views.

Figure 1:
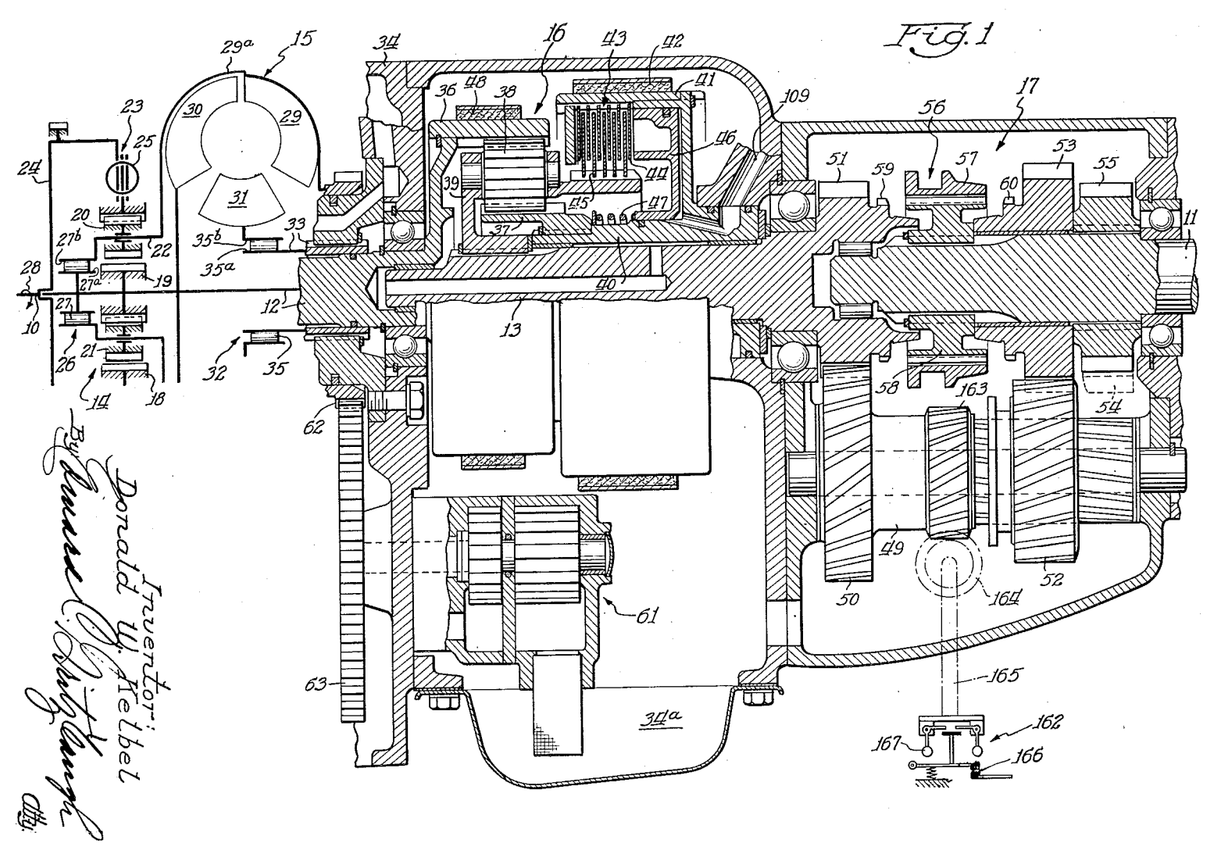
Fig. 1 is a longitudinal sectional view, partly schematic, of a transmission embodying the principles of the invention.

Referring now particularly to Fig. 1, the illustrated transmission is seen to comprise a drive shaft 10, a driven shaft 11, a first intermediate shaft 12 and a second intermediate shaft 13. The shaft 12 is piloted with respect to the shaft 10 and the shaft 13, and the shaft 13 is piloted with respect to the shaft 11. The transmission is intended to be installed in an automotive vehicle and the drive shaft 10 is adapted to be driven by the engine (not shown) of the vehicle and the driven shaft shaft 11 is adapted to drive the driving wheels (not shown) of the vehicle. Planetary speed-up gearing 14 and a hydraulic torque converter 15 are provided operatively between the shafts 10 and 12, and a planetary type gear set 16 is provided to drive the shaft 13 from the shaft 12. A gear set 17 of the countershaft type is provided operatively between the shafts 13 and 11.

The planetary gearing 14 comprises a ring gear 18, a sun gear 19, a planet gear 20 in mesh with the ring gear and a planet gear 21 in mesh with the planet gear 20 and with the sun gear 19. The planet gears are carried by a planet gear carrier 22. The ring gear 18 is connected with the shaft 10 by means of a vibration dampener 23 and a flywheel 24. The vibration dampener 23 is of standard construction and comprises springs 25 disposed between opposing parts of the dampener. The dampener absorbs vibrations between the flywheel 24 and the ring gear 18. The sun gear 19 is fixed on the shaft 12.

A one-way clutch 26 is provided between the carrier 22 and the shaft 12, and this one-way clutch is of a standard roller type comprising rollers 27 disposed between opposing cam surfaces 27a and 27b. The surfaces 27a and 27b are such that the roller clutch overruns when the shaft 10 and the carrier 22 are rotating in the forward direction as shown by the arrow 28 and the shaft 12 is either stationary or is rotating in this same direction but at a slower speed. Assuming that the engine of the vehicle is inoperative and the shaft 12 is rotated in the forward direction, the one-way clutch 26 will drive the carrier 22 in the forward direction so as to lock up the gear set 14 and thereby drive the shaft 10 at the same speed as the shaft 12. The roller clutch 26 is useful for starting the engine of the vehicle by pushing or towing the vehicle as will be hereinafter described more in detail.

The torque converter 15 is of standard construction and comprises a bladed impeller 29, a bladed rotor 30 and a bladed stator 31. The impeller 29 has a casing 29a which forms the casing of the torque converter, and this casing is connected with the carrier 22 of the planetary gear set 14. The rotor 30 of the torque converter is fixed to the shaft 12 as shown. The stator 31 is connected by means of a one-way brake 32 with a sleeve shaft 33 which is fixed with respect to the casing 34 of the transmission. The one-way brake 32 is of the standard roller type comprising rollers 35 disposed between opposing cam surfaces 35a and 35b. The surfaces 35a and 35b are of such shape that the rotor 31 is prevented by the roller brake 32 from rotating in the reverse direction, that is, in a direction opposite to that indicated by the arrow 28 but the roller brake 32 allows rotation of the stator 31 in the forward direction.

The casing 29a of the torque converter 15 functions as a container for fluid, and a driving connection between the three elements 29, 30 and 31 is through this fluid. The impeller 29 is the driving member of the converter and the rotor 30 is the driven member and drives the shaft 12. The blades of the stator 31 function to change the direction of flow of the fluid in the converter such that at the slower speeds of the rotor 30, the rotor and shaft 12 are driven at increased torques compared to the torque applied to the impeller 29. As long as there is this multiplication of torque, the stator 31 is stationary, being held in this connection by the roller brake 32, and after the speed of the rotor has increased an appreciable amount, the rotor 30 is driven with no increase in torque, and the stator begins to rotate in the forward direction, being allowed to rotate in this direction by the brake 32. The gear set 14 functions to increase the speed of the impeller 29 with respect to that of the shaft 10 when the shaft 12 is stationary as when the vehicle is being started. The sun gear 19 is stationary with the shaft 12 and the gear set 14 including the dual planets 20 and 21 has its carrier 22 and thereby the impeller 29 driven at an overdrive with respect to the speed of the ring gear 18.

The construction and operation of the planetary gear set 14 and converter 15 combination is very similar to that disclosed in Schneider Patent No. 2,333,681, and this arrangement will therefore not be further described in detail as the operation and construction of the arrangement will be clear from this patent.

The planetary gear set 16 comprises a ring gear 36, a sun gear 37, a planet gear 38 in mesh with the sun and ring gears and a planet gear carrier 39. The ring gear 36 is connected to the shaft 12, and the carrier 39 is splined to the shaft 13. The sun gear 37 is splined to a sleeve shaft 40 which carries a brake drum 41, and a brake band 42 is adapted to act on the drum 41. A multiple plate friction clutch 43 is provided between the drum 41 and the carrier 39, and this comprises friction clutch discs 44 splined to the drum 41 and friction clutch discs 45 splined to the carrier 39. An annular piston 46 is disposed within a similarly shaped cavity formed by the drum 41 and the shaft 40, and this piston is adapted to cause engagement of the clutch 43. A spring 47 disposed about the shaft 40 is provided for yieldingly holding the piston 46 in its clutch disengaged position in which it is shown. A friction brake 48 is provided for acting on the ring gear 36 for purposes hereinafter to be described.

The countershaft gear set 17 comprises a countershaft 49 rotatably disposed within the casing 34. The countershaft is provided with a gear 50 in mesh with a gear 51 formed on the shaft 13. A gear 52 is splined on the shaft 49 and is movable into mesh either with a gear 53 rotatably disposed on the shaft 11 or else with an idler gear 54 rotatably carried by the casing 34. The idler gear 54 is in mesh with a gear 55 fixed on the shaft 11.

A positive type clutch 56 is provided for connecting either the gear 51 or the gear 53 with the driven shaft 11. The clutch comprises a clutch sleeve 57 slidably splined on a hub 58 fixed to the shaft 11. Clutch teeth 59 and 60 are provided respectively on the gears 51 and 53, and the clutch sleeve 57 is adapted to mesh with either of these sets of teeth depending on its movement in one direction or the other.

The gear sets 16 and 17 provide a neutral condition, three speeds in forward drive and a drive in reverse between the shafts 12 and 11. The planetary gear set 16 provides a low and a high speed forward drive and the countershaft gear set 17 provides low speed and high speed forward drive ratios and a drive in reverse. For low speed ratio between the shafts 12 and 11, both of the gear sets 16 and 17 are conditioned for low speed drive.

The gear set 16 is conditioned for low speed drive by engaging the friction brake 42 which functions to hold the sun gear 37 stationary. The ring gear 36 is driven from the shaft 12 which in turn is driven through the gear set 14 and converter 15, and with the sun gear 37 being held stationary, the carrier 39 and thereby the intermediate shaft 13 are driven at an underdrive forward ratio with respect to the shaft 12. The clutch sleeve 57 is moved into its low position into mesh with the teeth 60 to condition the gear set 17 for low speed forward drive, and with the clutch sleeve being in this condition the drive is through the gears 51, 50, 52 and 53 and through the clutch 56 to the driven shaft 11. It will be understood that the gear 52 splined on the countershaft 49 has previously been moved into its forward position in which it is shown in the drawing. The speed reduction between the shafts 12 and 11 is thus the product of the reductions provided by the two gear sets 16 and 17 which are connected in tandem.

Intermediate speed forward drive is provided between the shafts 12 and 11 by shifting the clutch sleeve 57 to engage it with the teeth 59 while the friction brake 42 is allowed to remain in its engaged condition. The drive is then through the gear set 16 as before described wherein the carrier 39 is driven at a reduced speed, and the shaft 11 is driven directly from the shaft 13 through the clutch teeth 59 and clutch sleeve 57.

The transmission is shifted from intermediate speed ratio to direct drive by disengaging the friction brake 42 and engaging the friction clutch 43. Engagement of the friction clutch 43 locks together the brake drum 41 and thereby the sun gear 37 with the carrier 39 so that all of the parts of the gear set 16 rotate together, and the carrier 39 and shaft 13 are driven along with and at the same speed as the shaft 12. For this drive the clutch sleeve 57 remains engaged with the clutch teeth 59 and the shaft 11 is driven in direct drive with the shaft 13.

The shaft 11 is driven in reverse drive by engaging the gear 52 with the gear 54 and conditioning the planetary gear set 16 for a reduced speed drive with the brake 42 being engaged. The drive is then from the shaft 12 to the shaft 13 through the planetary gear set 16 with the carrier 39 and shaft 13 being rotated at a reduced speed, and the drive is from the shaft 13 through the gears 51, 50, 52, 54 and 55 to the shaft 11. Due to the presence of the idler 54 in the gear train, the shaft 11 is driven in the reverse direction.

When the clutch 43 and the brake 42 are disengaged and the clutch sleeve 57 is in its neutral position, the transmission is conditioned for neutral; however, in order to prevent rotation of the gears 51 and 53 to facilitate engagement of the clutch sleeve 57 with either of the said gears and in order to prevent rotation of the gear 55 in order to facilitate engagement of the gear 52 therewith, the brake 48 has been provided for the ring gear 36 which holds the ring gear and thereby the rotor 30 of the torque converter 15 stationary at idling speeds of the engine of the automobile. The friction brake 48 thus functions to absorb the so-called drag torque of the torque converter which is that torque transmitted through the torque converter at idling speeds of the automobile engine.

Figure 2:
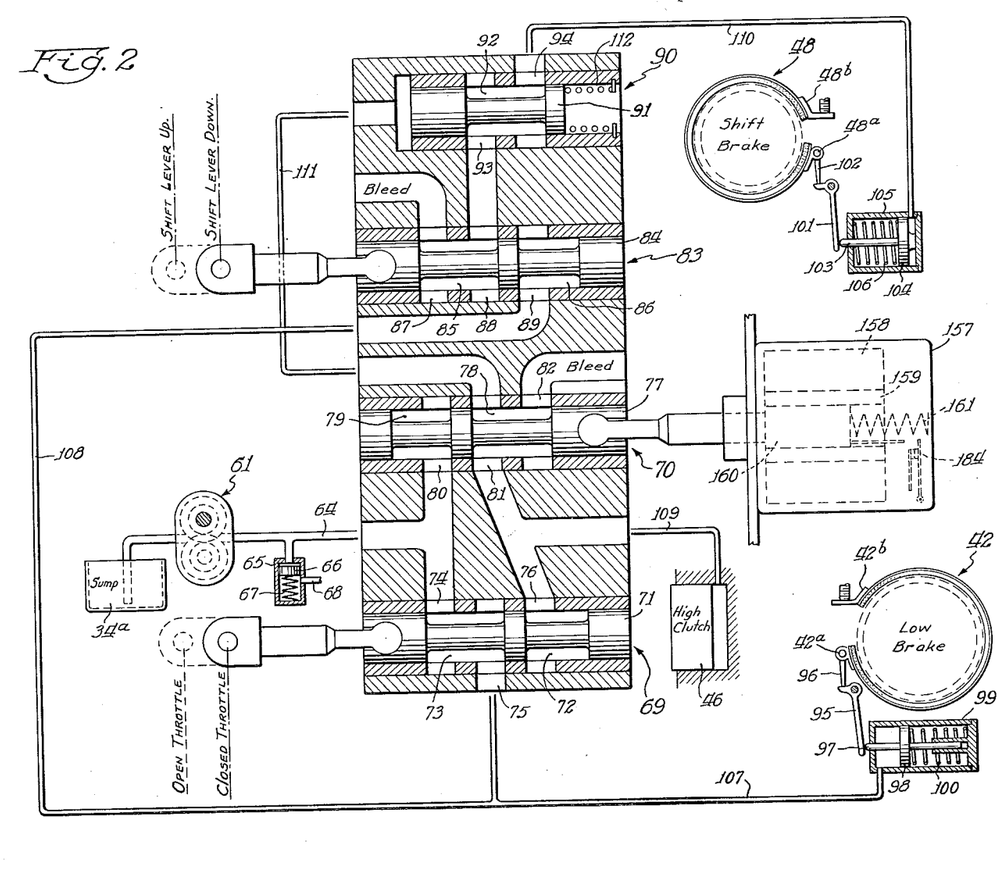
Fig. 2 is a diagrammatic illustration of hydraulic controls for the transmission illustrated in Fig. 1.

Referring now particularly to Fig. 2, the hydraulic control system for the transmission comprises a fluid pump 61. The pump may be of any suitable type such as the gear type and is driven from the impeller 29 by means of gears 62 and 63. The input side of the pump is disposed in sump 34a of the transmission provided by the casing 34. The pump 61 discharges into a conduit 64 to which is connected a pressure relief valve 65. The valve 65 comprises a piston 66 acted on by a spring 67 and the valve has a discharge opening 68 through which fluid passes after the fluid has reached the predetermined value in the conduit 64 necessary to move the piston 66 against the spring 67 to the discharge opening 68.

The conduit 64 is connected with valves 69 and 70. The valve 69 comprises a piston 71 having grooves 72 and 73, and the valve is provided with ports 74, 75 and 76. The valve 70 comprises a piston 77 having grooves 78 and 79, and the valve is provided with ports 80, 81 and 82. The pistons 71 and 77 are actuated as will be hereinafter described.

The hydraulic control system also includes a valve 83 which comprises a valve piston 84 having grooves 85 and 86. The valve includes ports 87, 88 and 89 as shown. The system includes a fourth valve 90 comprising a piston 91 having a groove 92, and the valve includes ports 93 and 94.

The hydraulic system is connected to actuate the two brake bands 42 and 48 and the multiple disc friction clutch 43 by means of its piston 46. The brake 42 is engaged by means of linkage comprising a lever 95 acting on a pin 96 connected to one end 42a of the brake. The other end 42b of the brake is anchored. The lever is acted on by a plunger 97 connected with a piston 98 slidably disposed in a cylinder 99. The piston 98 is adapted to be acted on by fluid under pressure on one side and is acted on by a spring 100 disposed within the cylinder 99 on its other side. The brake 48 is actuated by similar mechanism which includes a lever 101 acting on a pin 102. The pin 102 is connected to one end 48a of the brake 48 while the other end 48b of the brake is anchored. The lever 101 is acted on by a plunger 103 connected to a piston 104 disposed in a cylinder 105. The piston 104 is adapted to be acted on by fluid pressure on one side and is acted on by a spring 106 on its other side disposed within the cylinder 105.

The conduit 64 connected with the pump 61 is connected with the valves 69 and 70 as has been hereinbefore described and this is by means of the ports 74 and 80. The port 75 of the valve 69 is connected by means of a conduit 107 with the cylinder 99 and is connected by means of a conduit 108 with the port 89. The port 76 in the valve 69 as well as the port 81 in the valve 70 is connected by means of a conduit 109 with the clutch piston 46. The port 82 is simply a bleed port which is connected with the sump 34a of the transmission.

The port 87 in the valve 83 is another bleed port, and the port 88 in this valve is connected with the port 93 in the valve 90. The port 94 in this valve is connected by means of a conduit 110 with the cylinder 105 for the shift brake 48. The piston 91 in the valve 90 on one end is adapted to have fluid under pressure applied thereto, and this is by means of a conduit 111 which is connected with the port 81 in the valve 70. The other end of the piston 91 is acted on by a spring 112 which acts against the fluid pressure applied to the other end of the valve.

Figure 3:
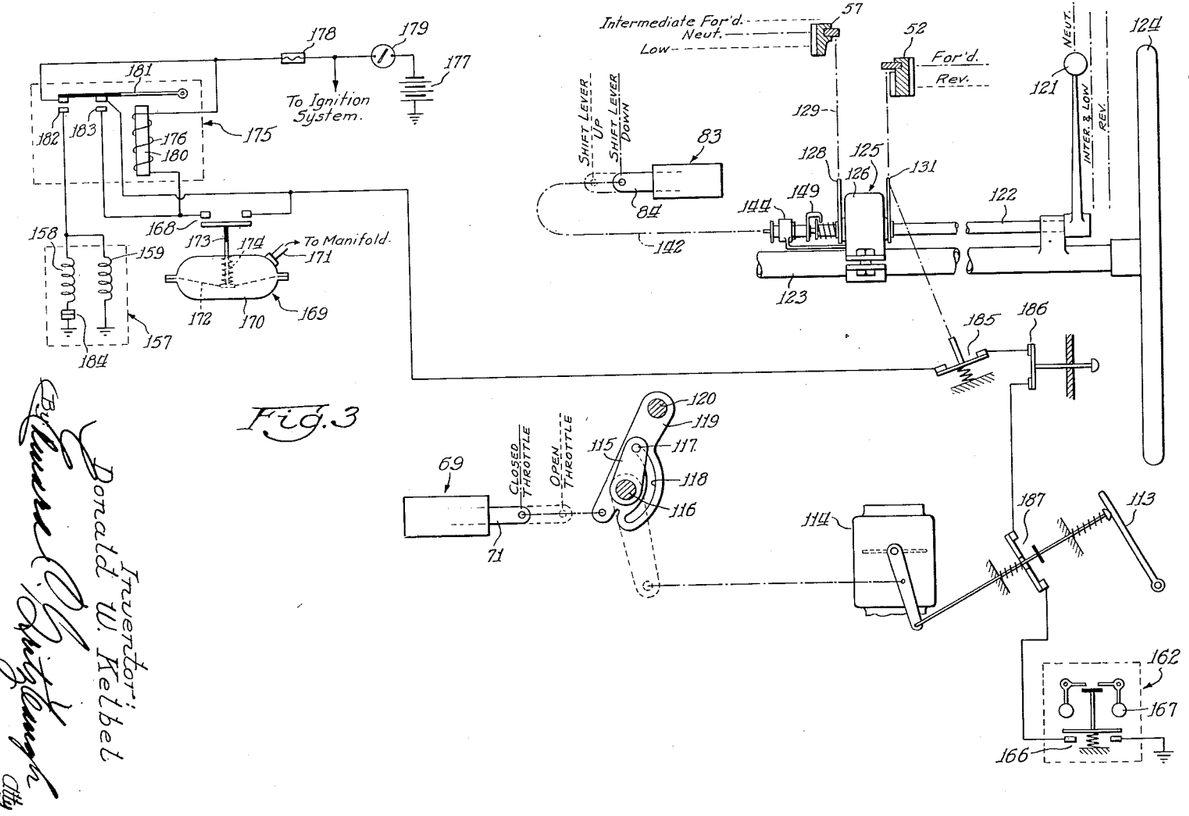
Fig. 3 is a diagrammatic illustration of electrical and mechanical controls for the transmission.

Referring now in particular to Fig. 3 for a description of the electric controls for the transmission and also for the operating mechanism for the valve pistons 71, 77 and 84, the piston 71 is connected with the accelerator 113 of the automotive vehicle. The accelerator 113 is connected with the usual throttle 114 for the vehicle. The connection between the accelerator 113 and piston 71 comprises a lever 115 pivoted at 116 and having a pin 117 working in a slot 118 of a lever 119. The lever 115 is linked with the accelerator to be moved thereby. The lever 119 is pivoted at 120, and the slot 118 is of such configuration that the lever 119 is given an initial movement with the lever 115 as the accelerator 113 is moved from a closed throttle position toward an open throttle position. The piston 71 is linked to the lever 119 and is thus moved by such initial movement of the accelerator. After this initial movement, the slot 118 is in the circular path of movement of the pin 117 and thus is given no further movement as the accelerator is moved toward further open throttle positions.

The valve piston 84 is linked with a shift lever 121 which is utilized for shifting the transmission either into its reverse or forward conditions. The lever 121 is rotatable with its shaft 122 which extends alongside of the vehicle steering column 123 and is journaled with respect to the column. The journaling of the shaft 122 with respect to the column 123 is such as to also allow the shaft 122 to move longitudinally with respect to the column 123. The lever 121 is located, as is usual with such selector levers, immediately beneath the steering wheel 124 of the automotive vehicle. The lever 121 is functionally linked with the clutch sleeve 57 and with the gear 52 by a mechanism 125 whereby the gear 52 may be shifted between its forward and reverse positions and the clutch sleeve 57 may be shifted from its neutral position into either its low or intermediate forward position.

Figure 4:
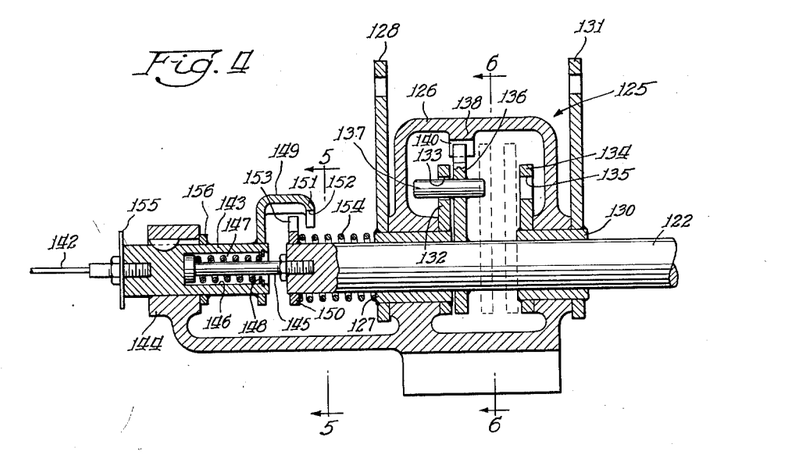
Fig. 4 is a longitudinal sectional view of certain mechanical controlling mechanism for the transmission.
Figure 5:
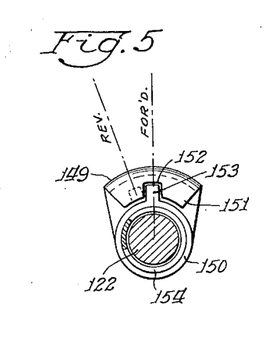
Figs. 5 and 6 are sectional views taken on lines 5—5 and 6—6 respectively of Fig. 4.
Figure 6:
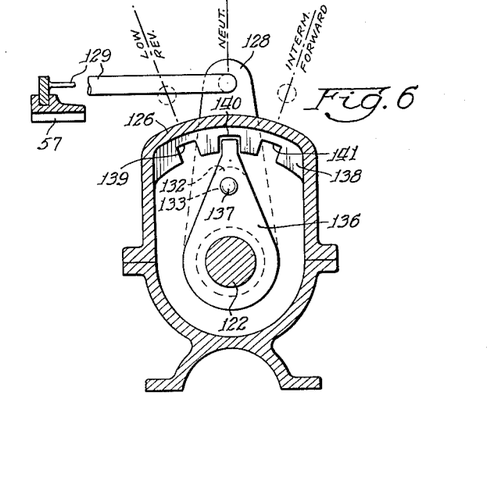

Referring to Figs. 4, 5, and 6 in particular, the mechanism 125 is seen to comprise a casing 126 which is fixed to the steering column 123. The shaft 122 extends through the casing 126 as shown, and a sleeve shaft 127 carrying a lever 128 is rotatably journaled within the casing 126 and on the shaft 122. The lever 128 is connected by a link 129, or by any other suitable linkage, with the clutch sleeve 57. Another sleeve shaft 130 is journaled within the casing 126 and on the shaft 122 and carries a lever 131. The lever 131 is connected by suitable linkage, similar to the linkage 129, with the shiftable gear 52. Shaft 127 has fixed thereto a lever 132 having an opening 133 therein, and the shaft 130 has fixed thereto a similar lever 134 having an opening 135 therein. Both of the levers 132 and 134 are within the casing 126 as shown.

The shaft 122 has fixed thereon a lever 136 disposed within the casing 126, and this lever carries a pin 137 adapted to enter either of the openings 133 or 135. A segment 138 is provided within the casing 126 and has notches 139, 140 and 141 formed therein. The end of the lever 136 may fit into any of the notches 139, 140 and 141 as is apparent and when the lever 136 is so disposed, the segment 138 prevents rotative movement of the lever 136 and shaft 122.

The valve piston 84 is connected with the mechanism 125 by means of a Bowden wire 142. A relatively short shaft 143 is keyed within an extension 144 of the casing 126, and the Bowden wire 142 is fixed to this shaft. The shaft 143 has a lost motion connection with the shaft 122, and this connection comprises a headed stud 145 fixed in the end of the shaft 122 and extending into a cavity 146 in the shaft 143. A spring 147 is provided between the head of the stud 145 and a washer 148 fixed within the open end of the cavity 146. Coacting levers 149 and 150 are fixed respectively on ends of the shafts 143 and 122. The lever 149 is provided with a segment 151 having a notch 152 therein, and the lever 150 is provided with a tang 153 adapted to pass through the notch 152. A spring 154 is provided between the lever 150 and the sleeve shaft 127 as shown. A washer 155 is provided for limiting movement of the shaft 143 in one direction, and the shaft 143 has a rib 156 formed thereon for limiting its movement in the opposite direction.

The lever 121 and the parts of the mechanism 125 are shown in their neutral conditions. In this condition of the parts, the clutch sleeve 57 is in its neutral condition, and the gear 52 is in its forward drive position in mesh with the gear 53. In order to shift the transmission out of its neutral condition either into its intermediate or low forward drive condition, the selector lever 121 and connected shaft 122 are moved upwardly towards the steering wheel 124 against the action of the spring 154, and the selector lever is then swung either counterclockwise or clockwise to respectively shift the collar 57 into either its low or intermediate positions. Such upward movement of the shaft 122 causes the end of the lever 136 to move out of the notch 140 in the segment 138, and the selector lever may then be rotated in either direction. The notch 140 functions to hold the lever 136 against swinging movement before the lever is moved out of the notch, as will be understood. The pin 137 continues to extend through the opening 133 in the lever 132 with such upward movement of the lever 121, and when the lever 121 is thereafter swung in one direction or the other, the pin 137 causes corresponding movement of the levers 132 and 128 and this movement of the latter lever is transmitted through the link 129 to the clutch sleeve 57 to shift the sleeve. After this swinging movement of the selector lever 121 has been completed, the selector lever is allowed to move downwardly again due to the action of the spring 154, and the lever 136 enters into the slot 139 or 141.

During such shifting movement from neutral to either low or intermediate speed forward drives, the valve piston 84 is moved from its "shift lever down" position to its "shift lever up" position and is again returned to its "shift lever down" position. This movement of the valve piston 84 is caused by the stud 145 and the spring 147 functioning to move the short shaft 143 along with the shaft 122. When the shaft 122 is moved upwardly to move the lever 136 out of the notch 140, this longitudinal upward movement of the shaft 122 is transmitted to the shaft 143 through the stud 145 and spring 147, and this movement of the shaft 143 through the Bowden wire 142 moves the piston 84 from its "shift lever down" position to its "shift lever up" position. When the selector lever 121 has been swung into either its low or intermediate positions and allowed to move downwardly to bring the lever 136 into engagement with either of the notches 139 and 141 under action of the spring 154, corresponding movement of the shaft 143 and the valve piston 84 takes place, so that the valve piston 84 is again moved into its "shift lever down" position. Similarly, when the selector lever 121 is raised, swung, and lowered from either its low or intermediate speed positions back to its neutral position, the valve piston 84 is moved out of and is then returned to its "shift lever down" position.

In order to condition the transmission for reverse drive, the selector lever 121 is moved upwardly against the action of the spring 154 a greater distance than for a shift into either intermediate or low so as to move the pin 137 out of the opening 133 and into the opening 135 of the lever 134. Subsequent counter-clockwise rotation of the shaft 122 will cause similar swinging movement of the levers 131 and 134, and this will result in shifting of the gear 52 into its reverse drive position in mesh with the idler gear 54 by means of the linkage provided between the gear 52 and lever 131. During the initial part of the upward movement of the shaft 122, the valve piston 84 is moved to its "shift lever up" position as has been described. Further movement of the valve and the short shaft 143 connected therewith is prohibited due to the action of the washer 155 in contacting the end of the extension 144. During the remainder of the upward movement of the shaft 122, the spring 147 is flexed, and the tang 153 passes through the slot 152 of the lever 149. Upon the subsequent swinging movement of the lever 121 and shaft 122 which actually causes the shifting of the gear 52, the tank 153 passes over the segment 151 as is indicated in Fig. 5 and then when the selector lever 121 is released to allow the spring 154 to take effect, the lever 121 and shaft 122 have a limited downward movement which is limited by the tank 153 contacting the segment 151 and the rib 156 moving into engagement with the extension 144 of the case 126. The piston 84 has then again been moved into its "shift lever down" position.

The valve piston 77 is controlled by means of an electric solenoid 157 (see Figs. 2 and 3). The solenoid comprises an energizing winding 158, a holding winding 159 and an armature 160 which is adapted to be given movement upon energization of these windings. The armature 160 is connected with the piston 77 and is acted on by a spring 161 as shown.

The electric control system comprises a governor 162 of any suitable design which is driven according to the speed of the driven shaft 11 and countershaft 49 as by means of the gears 163 and 164. The gear 163 is fixed on the countershaft 49 and the gear 164 is in mesh with the gear 163 and may be connected with the governor by any suitable means, as by means of a shaft 165. The governor comprises a switch 166 which is closed above a predetermined speed of the countershaft 49 and driven shaft 11 when the gears 52 and 53 are in mesh, and the governor may comprise centrifugal weights 167 for causing the switch to close above the predetermined speed.

The electric system also comprises a manifold switch 168 which is actuated by a motor 169 responsive to the manifold vacuum of the internal combustion engine with which the vehicle is equipped. The motor 169 comprises a casing 170 connected to the manifold of the internal combustion engine by means of a conduit 171. A flexible diaphragm 172 is disposed within the casing 170 and is connected by means of a plunger 173 with the switch 168. A spring 174 acts on the diaphragm to maintain the switch 168 open until the manifold vacuum increases to a value corresponding to a closed throttle position of the accelerator 113. As is well known, the manifold vacuum increases when the accelerator is in a closed throttle position and decreases when the accelerator is in an open throttle position, and opening and closing of the switch 168 thus corresponds roughly to the opening and closing of the throttle 114.

The electric system comprises an electric relay 175 having a winding 176 which is connected to the battery 177 of the vehicle through a fuse 178 and the ignition switch 179. The relay comprises a magnetizable core 180 and an armature 181 attracted thereto when the core is magnetized and two sets of contacts 182 and 183 carried by the armature. One of the contacts 182 is connected with the battery 177 through the ignition switch and fuse and the other contact 182 is connected with one end of each of the windings 158 and 159. The winding 158 is connected with a switch 184 which is actuated by the armature 160 of the solenoid 157 so that when the armature is moved into its energized position the switch 184 is opened.

The switch 168 is connected to the lower end of the winding 176, and the two contacts 183 are respectively connected with the two contacts of the switch 168, so that the switch comprising the contacts 183 is in parallel with the switch 168. The switch 168 is connected in series with a reverse switch 185. The switch 185 is adapted to be opened whenever the operator's shift lever 121 is moved to its reverse position, and this switch may be directly actuated by the lever 131. The switch 185 is connected with another switch 186 which is located on the dashboard of the vehicle, and the switch 186 is connected with a kickdown switch 187 actuated by the accelerator 113. The switch 187 normally is closed and is opened when the accelerator 113 is moved to its open throttle position. The switch 187 is connected with the governor switch 166 which is grounded as shown. It will thus be apparent that the switches 168, 185, 186, 187 and 166 are all in series, with the switch 168 being connected in parallel with the armature contacts 183.

The transmission is conditioned for low speed forward drive by moving the operator's control lever 121 into its low speed position, and this has the effect of moving the clutch sleeve 57 into engagement with the clutch teeth 60. In order to make this shift, as has been hereinbefore described, the lever 121 must be raised by the operator to take the lever 136 out of the notch 140, and this has the effect of moving the valve piston 84 from its "shift lever down" position to its "shift lever up" position in which position the groove 86 connects the ports 88 and 89. The accelerator is assumed to be in its closed throttle position, and the valve piston 71 of the accelerator valve 69 is in the position shown in Fig. 2 when the accelerator is in this position. In this position of the piston 71, the groove 73 in the piston connects the ports 74 and 75 of the valve. Fluid at a predetermined pressure is within the conduit 64, being supplied to the conduit from the pump 61 driven by the impeller 29 of the torque converter 15 and maintained at this pressure by the relief valve 65, and this fluid flows through the port 74, groove 73, port 75, conduit 108, port 89, groove 86, port 88, port 93, groove 92, port 94 and conduit 110 to the cylinder 105. Fluid under pressure is thereby applied to the piston 104, and the brake 48 is applied to the ring gear 36 which is driven by the rotor 30 and sun gear 19 of the planet gear set 14.

Engagement of the brake 48 assures that there can be no drag torque exerted by the torque converter 15 on the gear 53 which would tend to rotate the gear and would make engagement of the clutch sleeve 57 with the teeth 60 difficult. Neither the brake 42 nor the clutch 43 is engaged, and the power train to the gear 53 from the torque converter is thus broken; however, there is some friction between the parts which would tend to cause rotation of the gear 53, assuming that the shaft 12 is not arrested from rotation in some manner, and hence the desirability of the shift brake 48 coming into engagement just prior to engagement of the clutch sleeve 57 with the teeth 60. When the clutch sleeve 57 has been completely engaged with the teeth 60, the shift lever 121 is then returned to its lower position, and the valve 84 returns to its position in which it is shown in Fig. 2. The brake cylinder 105 is then drained through the conduit 110, the port 94, the groove 92, the port 93, the port 88, the groove 85 and the bleed passage 87, and the shift brake 48 disengages.

A drive in low gear ratio is then completed by depressing the accelerator 113, and this has the effect of moving the accelerator valve piston 71 from its closed throttle position to its open throttle position. When the piston 71 is so moved, the brake cylinder 99 is drained of fluid through the conduit 107, the port 75, the groove 72, the port 76, the port 81, the groove 78 and the bleed passage 82. The spring 100 in the cylinder 99 is then effective for applying the brake 42 through the lever 95 and pin 96, and the low speed power train is thus completed, the low speed power train being through the gear set 14 and converter 15 between the shafts 10 and 12 and from the shaft 12 to the shaft 13 through the planetary gear set 16 and thence through the gears 51, 50, 52 and 53 to the driven shaft 11. The brake 42 may be engaged as gradually as desired simply by depressing the accelerator only slightly so as to cause a limited communication between the port 75 and groove 72 and cause a gradual fluid draining of the cylinder 99. It will be understood that before this movement of the accelerator the piston 71 is in the position in which it is illustrated in Fig. 2 in which fluid under pressure is applied to the piston 98 in the cylinder 99 from the conduit 64 through the port 74, the groove 73, the port 75 and the conduit 107, thus maintaining the brake 42 disengaged until the accelerator is depressed. It will be noted, incidentally, that this movement of the accelerator piston 71 to its open throttle position has the effect of connecting the port 89 of the valve 83 with the bleed passage 82 through the port 75, the groove 72, the port 76, the port 81, and the groove 78, and hence even if the valve 84 is not returned to its position in which it is illustrated in Fig. 2 prior to movement of the accelerator toward an open throttle position; nevertheless, the shift brake 48 is disengaged upon this movement of the accelerator.

The transmission may be shifted from neutral to intermediate speed ratio and a drive completed in this ratio in substantially the same manner as the low speed drive, except that the selector lever 121 is swung in a clockwise direction instead of in a counter-clockwise direction after the lever has been preliminarily raised to move the lever 136 out of the notch 140 in the circular rib 138 whereby to shift the clutch sleeve to engage with the teeth 59. The power train in intermediate speed ratio is completed by depressing the accelerator and proceeds through the same elements as the low speed power train except that a direct drive between the gear 51 and driven shaft 11 is had instead of through the gears 50, 52, and 53. Preferably both the intermediate and low speed ratios are completed when the vehicle is in a state of rest, and the low speed ratio may be used only as an emergency speed ratio.

The transmission may be upshifted from intermediate speed ratio to high speed ratio by releasing the accelerator 113 to allow it to return to its closed throttle position after the speed of the driven shaft has become sufficient to actuate the governor 162 to close its switch 166. When the governor switch is closed, a circuit may be completed through the winding 176 of the relay 175, the circuit being from the battery 177 and ignition switch 179 through the winding 176, the switch 168, the switch 185, the switch 186, the switch 187 and the switch 166. As has been hereinbefore described, the switch 168 is open when the accelerator is in a substantially throttle open position; however, when the accelerator is released to allow it to return to a closed throttle position, the manifold vacuum increases to close the switch 168. When this circuit is thus completed, the winding 176 and core 180 are energized, and the armature 181 is then moved to energized position in which the contacts 182 and 183 are closed. Closing of the contacts 183 has the effect of bridging the switch 168 and even though the switch 168 is thereafter opened as when the accelerator is moved to an open throttle position; nevertheless, the relay 175 remains energized.

Closure of the contacts 182 has the effect of energizing the windings 158 and 159 of the solenoid 157. Energization of these windings has the effect of moving the armature 160 of the solenoid to its energized position in which the valve piston 77 is moved to bridge the ports 80 and 81 with the groove 79. The switch 184 is actuated by the armature 160 in its energized position to open the switch, and this has the effect of breaking the circuit through the energizing winding 158. The circuit remains completed, however, through the holding winding 159, and this winding is sufficient to hold the armature 160 in its energized position.

This movement of the valve piston 77 into a position in which its groove 79 connects the ports 80 and 81 has the effect of engaging the friction clutch 43 and disengaging the friction brake 42 to shift the transmission to high speed ratio. The high clutch piston 46 has fluid pressure applied thereto for engaging the clutch 43 from the conduit 64 and through the port 80, the groove 79, the port 81 and the conduit 109. The piston 71 is assumed to be in its open throttle position, and fluid pressure is similarly applied to the piston 98 in the cylinder 99 for the brake 42 from the conduit 109 and through the port 76, the groove 72, the port 75 and the conduit 107. If the accelerator has not been utilized to shift the piston 71, the brake 42 is nevertheless disengaged, since fluid pressure in this case will be applied to the conduit 107 through the port 74, groove 73 and port 75. Thus, at the same time that fluid under pressure is applied to the clutch piston 46 for engaging the clutch 43, fluid under pressure is applied to the piston 98 for the brake 42 for disengaging the brake. The shift into high speed ratio is thus completed.

The valve piston 77 when in its energized position has the additional function of applying fluid pressure to one end of the valve piston 91, this application of fluid pressure being from the conduit 64, and through the port 80, the groove 79, the port 81, and the conduit 111. The valve piston 91 is thus moved to the right as seen in Fig. 2 against the action of the spring 112, and the groove 92 in the piston 91 is then out of communication with the port 93 and thereby the port 88 in the valve 83. Due to this movement of the valve piston 91, fluid under pressure cannot be applied to the piston 104 in the cylinder 105 for engaging the shift brake 48, regardless of the movement given the accelerator piston 71 and the shift lever valve piston 84.

The transmission may be downshifted from high speed ratio to intermediate speed ratio by moving the accelerator 113 to an open throttle position, at which position it will open the switch 187. Opening of this switch has the effect of deenergizing the relay 175 and thereby the solenoid 157. Upon deenergization of the solenoid 157, the spring 161 in the solenoid moves the valve piston 77 back into the position in which it is illustrated in Fig. 2. In this position the piston 77 connects the conduit 109 with the bleed port 82 through the groove 78 and the port 81. The conduit 107 is also connected with the bleed port 82 through the port 75, piston groove 72, port 76, port 81, and groove 78. The high speed clutch 43 is thus disengaged and the brake 42 is engaged under the action of the spring 100 in the cylinder 99, and the transmission is again in intermediate speed ratio.

The dash switch 186 has the same effect on the circuit as the switch 187, namely, of breaking the circuit. When this switch is opened, the relay 175 cannot be energized regardless of the condition of the governor switch 166, and the transmission is maintained in its intermediate speed ratio.

The transmission is shifted into reverse drive by movement of the shift lever 121 as indicated in Fig. 3, and the lever 121 is operative through the lever 131 to move the gear 52 into its reverse position. In order to move the shift lever 121 in this manner, the lever 121 is raised and this has the effect of moving the valve 84 into its "shift lever up" position to engage the shift brake 48; the engagement of the gear 52 with the gear 54 being thereby made easier in the same manner as is the engagement by the clutch sleeve with the teeth 59 or 60 due to the action of the brake 48. Completion of the reverse drive power train is then effected by depressing the accelerator 113 to an open throttle position which will have the effect on the valve 71 to engage the brake 42, as when the vehicle is started in low or intermediate speed drive. The switch 185, when the lever 124 is moved to its reverse position, is actuated to break the circuit through the relay 175, and even though the governor switch 166 closes, the circuit through the relay cannot be completed for energizing the solenoid 157 in reverse drive.

My improved transmission advantageously includes gearing which provides three forward speed ratios and a reverse drive in tandem with a hydraulic torque converter. The gearing includes the planetary gear set 16 and the countershaft gear set 17, the latter gear set being conditioned for its various drives by means of positive clutch mechanisms, and the planetary gear set being automatically upshifted and downshifted as has been described. The brake 48 for the rotor 30 of the hydraulic torque converter is automatically actuated so that the brake is applied whenever the lever 121 is given a movement longitudinally with respect to the upright vehicle steering column 123, preliminary to moving the control 121 arcuately for shifting the clutch sleeve 57 or the gear 52. Since the brake 48 is engaged at this time, the parts of these positive clutching mechanisms are all at rest before engagement, which makes engagement easy. The control mechanism for the transmission advantageously includes the valve piston 91 for preventing under any circumstances engagement of the brake 48 when the solenoid 157 is effective to shift the transmission into high speed ratio. The brake 48 cannot be engaged in low speed ratio when the accelerator valve 71 is moved to an open throttle position, regardless of any movement given the piston 84 by means of the control 121, since the conduit 108 for supplying fluid pressure to the valve 83 is connected with the bleed port 82 through the groove 78, the ports 81 and 76, the groove 72 and the port 75. The control arrangement advantageously includes the vacuum motor 169 connected with the intake manifold of the vehicle engine which functions to allow an upshift into high speed forward drive when the vehicle speed is above a predetermined value. The reverse switch 185 actuated by the control 121 advantageously does not allow any upshift in the planetary unit 16 when the transmission is conditioned for reverse.

I wish it to be understood that my invention is not to be limited to the specific constructions and arrangements shown and described, except only insofar as the claims may be so limited, as it will be apparent to those skilled in the art that changes may be made without departing from the principles of the invention. In construing the appended claims, I wish it to be understood that where I specify an engaging means or a positive engaging means, I mean to include by this expression not only a clutch, but I also intend to include by this expression a brake.

I claim:

1. In a transmission for an automotive vehicle, the combination of a drive shaft, a driven shaft, a hydrodynamic coupling device driven by said drive shaft and having a driven element or rotor, a positive type engaging means for completing a power train between said rotor and said driven shaft, a brake for said rotor for retarding rotation of the rotor to allow a facile engagement of said positive type engaging means, a control adapted to be actuated by the vehicle operator for causing engagement of said positive type engaging means, said control being effective to cause engagement of the brake preliminary to a shifting movement of the control for engaging the positive engagement means, an accelerator for the vehicle, and means controlled by said accelerator for assuring disengagement of said brake when said accelerator is moved from a closed throttle position toward an open throttle position.

2. In a transmission for an automotive vehicle, the combination of a drive shaft, a driven shaft, a hydrodynamic coupling device driven by said drive shaft and having a driven element or rotor, a positive type clutch for completing a power train between said rotor and said driven shaft, a brake for said rotor for retarding rotation and for rendering facile the engagement of said positive clutch, a control adapted to be actuated by the vehicle operator connected to shift said positive clutch, a fluid motor for engaging said brake, a source of fluid pressure, means connected with said control for connecting said fluid pressure source and said fluid motor for engaging said brake when said control is given a movement preliminary to its clutch engaging movement, an accelerator for the vehicle, and means under the control of said accelerator for draining said fluid motor of fluid for disengaging said brake when said accelerator is moved from a closed throttle position to an open throttle position.

3. In a transmission for an automotive vehicle, the combination of a drive shaft, a driven shaft, a hydrodynamic coupling device driven by said drive shaft and having a rotor or driven element, a positive type engaging means and a friction type engaging means for completing a power train between said rotor and said driven shaft, a brake for said rotor for facilitating engagement of said positive engaging means, a lever adapted to be controlled by the operator of the vehicle for causing engagement of the positive engaging means and for causing engagement of the brake by a movement preliminary to its movement for engaging said positive engaging means, an accelerator for the vehicle, means controlled by said accelerator for engaging said friction engaging means for completing the power train between said rotor and said driven shaft after said friction engaging means has preliminarily been engaged upon movement of the accelerator from closed throttle position to an open throttle position, and means controlled by said accelerator for assuring release of said brake when said accelerator is moved from its closed throttle position toward an open throttle position.

4. In a transmission for an automotive vehicle, the combination of a drive shaft, a driven shaft, a hydrodynamic coupling device driven by said drive shaft and having a rotor or driven element, a friction brake and a positive clutch for completing a power train between said rotor and said driven shaft, a control adapted to be operated by the operator of the vehicle and connected to shift said positive clutch into engagement, a brake for said rotor for rendering facile the engagement of said friction clutch, a fluid pressure motor for engaging said last-named brake, a source of fluid pressure, a valve connected with said control for connecting said source of fluid pressure, a valve connected with said control for connecting said source of fluid pressure and said motor when said control is given a movement preliminary to its movement for engaging said positive clutch, a fluid pressure motor for said first-named brake and holding the brake disengaged when said motor is operative, an accelerator for the vehicle, and a valve connected with said accelerator for draining said two motors of fluid when said accelerator is moved from a closed throttle position to an open throttle position for engaging said first-named brake to complete said power train and for disengaging said second-named brake.

5. In a transmission, the combination of a drive shaft, a driven shaft, a hydrodynamic coupling device driven by said drive shaft and having a rotor, means for completing a low speed power train between said rotor and said driven shaft and including a positive type engaging means and a friction type engaging means both of which are engaged to complete the power train, a clutch for completing a high speed power train between said rotor and said driven shaft which also includes said positive engaging means, a brake for said rotor for facilitating engagement of said positive engaging means, and means for preventing engagement of said brake when said clutch is engaged for the high speed power train.

6. In a transmission, the combination of a drive shaft, a driven shaft, a hydrodynamic coupling device driven by said drive shaft and having a rotor or driven element, means for providing a low speed power train between said rotor and said driven shaft and including a positive type clutch and a friction type brake, means for providing a high speed power train between said shafts and including a friction clutch which is engaged together with said positive clutch for completing the power train, a brake for said rotor for facilitating engagement of said positive clutch, a fluid pressure motor for engaging said last-named brake, a source of fluid pressure, and a valve between said fluid pressure source and said fluid pressure motor for cutting off the source from the motor when said friction clutch is engaged.

7. In a transmission for an automotive vehicle, the combination of a drive shaft, a driven shaft, a hydrodynamic coupling device driven by said drive shaft and having a rotor or driven element, means for completing a low speed power train between said rotor and said driven shaft and including a positive clutch and a friction brake, means for completing a high speed power train between said rotor and said driven shaft and including a friction clutch which when engaged together with said positive clutch completes the high speed power train, a fluid pressure motor for actuating said brake, a fluid pressure motor for actuating said friction clutch, a source of fluid pressure, a friction brake for the rotor of said hydrodynamic device for facilitating engagement of said positive clutch, a fluid pressure motor for said last-named brake, said motor for said first-named friction brake being operative when fluid pressure is applied thereto to disengage said brake, an accelerator for the vehicle, a valve under the control of the accelerator for draining said first-named fluid motor of fluid to apply said first-named brake and to complete said low speed power train when the accelerator is moved from a closed throttle position toward an open throttle position, a high shift valve effective for supplying fluid under pressure to both the motor for said friction clutch and the motor for said first named friction brake for engaging the clutch and disengaging the brake to shift the transmission into high speed ratio, and a valve effectively between said fluid pressure source and the motor for said rotor brake, said last-named valve being connected with said high shift valve whereby the valve disconnects the motor for said rotor brake from said fluid pressure source when the transmission is shifted to high speed ratio.

8. In a transmission for an automotive vehicle, the vehicle being driven by an engine having a manifold which develops a vacuum, the combination of a drive shaft adapted to be driven by the vehicle engine, a driven shaft adapted to drive the vehicle, means providing a low speed power train between said shafts, an accelerator for the vehicle engine, means under the control of said accelerator for completing said low speed power train to start said driven shaft and the vehicle from rest when the accelerator is moved from a closed throttle position to an open throttle position, means for providing a high speed power train between said shafts and a vacuum motor connected with said manifold for completing said high speed power train in lieu of said low speed power train when the vacuum in said manifold increases to a predetermined value, said last-mentioned means including an electric switch actuated by the vacuum motor and electrically responsive means connected with said switch which is effective to change the speed ratio from low speed ratio to high speed ratio.

9. In a transmission for an automotive vehicle, the vehicle being driven by an engine having a manifold which develops vacuum, a drive shaft adapted to be driven by the vehicle engine, a driven shaft adapted to drive the vehicle, means providing a low speed power train between said shafts, means providing a high speed power train between said shafts, a governor responsive to the speed of said driven shaft, an accelerator for the vehicle, means under the control of said accelerator for completing said low speed power train to start said driven shaft and the vehicle from rest when the accelerator is moved from a closed throttle position toward an open throttle position, a motor responsive to the vacuum in said manifold and means under the control of said motor and said governor for completing said high speed power train when the driven shaft speed is above a predetermined value and the vacuum in said manifold is above a predetermined value, said last-mentioned means including an electric switch actuated by the vacuum motor and electrically responsive means connected with said switch which is effective to change the speed ratio from low speed ratio to high speed ratio.

DONALD W. KELBEL.

References Cited in the file of this patent

UNITED STATES PATENTS

| Number | Name | Date |
|---|---|---|
| 2,094,449 | Forichon | Sept. 28, 1937 |
| 2,238,748 | Patterson | Apr. 15, 1941 |
| 2,242,276 | Vincent | May 20, 1941 |
| 2,260,759 | Surdy | Oct. 28, 1941 |
| 2,262,747 | Banker | Nov. 18, 1941 |
| 2,277,214 | Dodge | Mar. 24, 1942 |
| 2,281,916 | Claytor | May 5, 1942 |
| 2,292,776 | Sinclair | Aug. 11, 1942 |
| 2,298,648 | Russell | Oct. 13, 1942 |
| 2,316,390 | Biermann | Apr. 13, 1943 |
| 2,318,481 | Greenlee | May 4, 1943 |
| 2,328,291 | Osborne | Aug. 31, 1943 |
| 2,328,392 | Neracher | Aug. 31, 1943 |
| 2,333,681 | Schneider | Nov. 9, 1943 |
| 2,334,402 | Flinn | Nov. 16, 1943 |
| 2,339,967 | Vincent | Jan. 25, 1944 |
| 2,343,291 | Gilfillan | Mar. 7, 1944 |
| 2,343,955 | Cotterman | Mar. 14, 1944 |
| 2,374,303 | Osborne | Apr. 24, 1945 |
| 2,380,717 | Beltz | July 31, 1945 |
| 2,396,551 | Boyce | Mar. 12, 1946 |
| 2,408,008 | Tipton | Sept. 24, 1946 |
| 2,557,791 | Long | June 19, 1951 |